(12) United States Patent
Weber

(10) Patent No.: US 11,429,884 B1
(45) Date of Patent: Aug. 30, 2022

(54) NON-TEXTUAL TOPIC MODELING

(71) Applicant: Amazon Technologies, Inc., Seattle, WA (US)

(72) Inventor: Kristin Marie Weber, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 213 days.

(21) Appl. No.: 16/878,398

(22) Filed: May 19, 2020

(51) Int. Cl.
| | |
|---|---|
| *G06Q 30/02* | (2012.01) |
| *G06N 7/00* | (2006.01) |
| *G06F 17/16* | (2006.01) |
| *G06F 16/9035* | (2019.01) |
| *G06Q 10/06* | (2012.01) |
| *G06Q 30/06* | (2012.01) |
| *G06F 40/40* | (2020.01) |
| *G06F 16/906* | (2019.01) |

(52) U.S. Cl.
CPC ............ *G06N 7/00* (2013.01); *G06F 16/906* (2019.01); *G06F 16/9035* (2019.01); *G06F 17/16* (2013.01); *G06F 40/40* (2020.01); *G06Q 10/067* (2013.01); *G06Q 30/0202* (2013.01); *G06Q 30/0603* (2013.01); *G06Q 30/0623* (2013.01); *G06Q 30/0631* (2013.01); *G06Q 30/0633* (2013.01)

(58) Field of Classification Search
CPC .................................................... G06Q 30/02
See application file for complete search history.

(56) References Cited

U.S. PATENT DOCUMENTS

| | | | | |
|---|---|---|---|---|
| 6,892,179 B1 * | 5/2005 | Zacharia | ............ | G06Q 30/0206 705/7.29 |
| 7,987,188 B2 * | 7/2011 | Neylon | ................ | G06F 16/313 706/45 |
| 9,443,249 B2 * | 9/2016 | Davies | ............... | G06Q 30/0201 |
| 10,373,067 B1 * | 8/2019 | Chen | ...................... | G06N 20/00 |
| 11,113,734 B2 * | 9/2021 | Dhawan | ............ | G06Q 30/0255 |

(Continued)

FOREIGN PATENT DOCUMENTS

| | | | | |
|---|---|---|---|---|
| AU | 2018219998 A1 * | 9/2018 | ............. | G06Q 10/10 |
| CN | 106874998 A * | 6/2017 | ............... | G06N 3/00 |

(Continued)

OTHER PUBLICATIONS

Lee, Paul H.; Yu, Philip LH, An R package for analyzing and modeling ranking data, BMC Medical Research Methodology, 13, 65, May 14, 2013 (Year: 2013).*

(Continued)

*Primary Examiner* — Marilyn G Macasiano
(74) *Attorney, Agent, or Firm* — K&L Gates LLP

(57) ABSTRACT

Devices and techniques are generally described for non-textual topic modeling. In some examples, a first item of a plurality of items may be identified. A first ranked list of items from the plurality of items may be generated for the first item using collaborative filtering. Topic modeling input data representing associations between the first item and each item in the first ranked list may be generated. Second data may be generated by inputting the topic modeling input data into a topic modeling algorithm. The second data may comprise one or more topics for the first ranked list of items.

20 Claims, 12 Drawing Sheets

(56) References Cited

U.S. PATENT DOCUMENTS

| | | | | |
|---|---|---|---|---|
| 2008/0005051 A1* | 1/2008 | Turner | ................ | G06F 40/242 |
| | | | | 706/20 |
| 2008/0215571 A1* | 9/2008 | Huang | ................ | G06F 16/345 |
| | | | | 707/999.005 |
| 2011/0022602 A1* | 1/2011 | Luo | .................. | G06F 16/24578 |
| | | | | 707/723 |
| 2012/0284249 A1* | 11/2012 | Ahmed | .............. | G06F 16/9535 |
| | | | | 707/706 |

FOREIGN PATENT DOCUMENTS

| | | | | |
|---|---|---|---|---|
| WO | WO 2012/173900 A2 * | 12/2012 | ............ | G06Q 50/10 |
| WO | WO 2018/152534 A1 * | 8/2018 | ............ | G06F 17/30 |

OTHER PUBLICATIONS

Ekstrøm, Claus Thorn; Gerds, Thomas Alexander; Jensen, Andreas Kryger; Brink-Jensen, Kasper, Sequential rank agreement methods for comparison of ranked lists (English), Aug. 27, 2015 (Year: 2015).*

Junjie Lianf; Jinlong Hu; Shoubin Dong; Vasant Honovar, Top-N-Rank: A Scalable List-wise Ranking method for Rcommender Systems (English), 2018 IEEE International Conference on Big Data (Big Data) (pp. 1052-1058), Dec. 1, 2018 (Year: 2018).*

* cited by examiner

NON-TEXTUAL TOPIC MODELING

BACKGROUND

In machine learning and natural language processing, topic modeling is an unsupervised learning technique that detects words and/or phrases in a set of documents, and automatically clusters words and/or phrases that characterize the documents. A topic model is a statistical model used to determine abstract topics that occur in a collection of text documents. Topic modeling is sometimes used to determine hidden semantic features in a body of text. Topic modeling often determines a topic for a particular document based on a frequency with which words related to the topic appear within the document.

DETAILED DESCRIPTION

Figure 1:
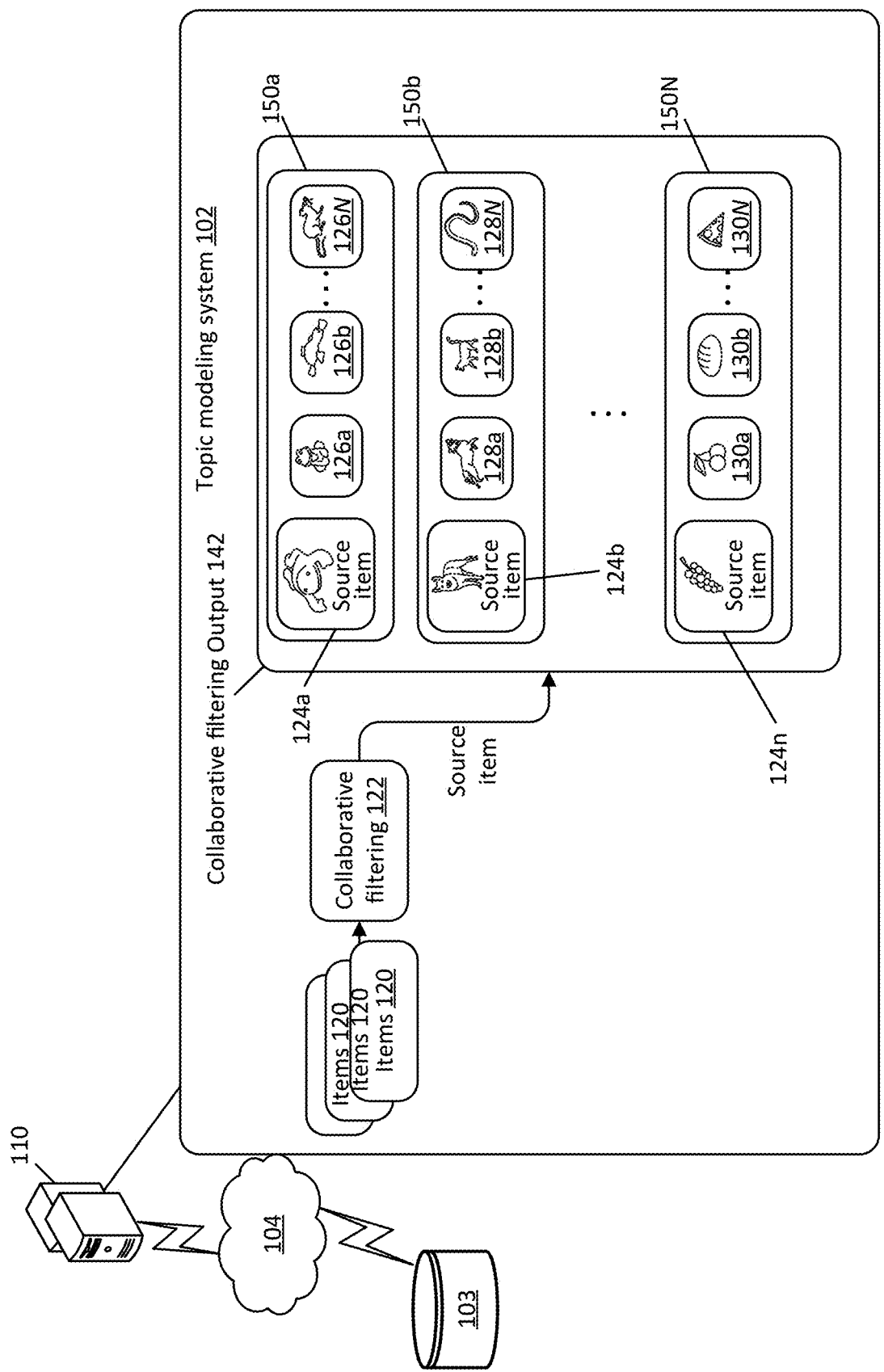
FIG. 1 is a block diagram illustrating a topic modeling system, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Topic modeling is often used in natural language processing to automatically determine one or more topics for a text document and/or group of text documents. In order to determine the topic, each document is used to generate a "bag of words" comprising a set of each unique word (and/or phrase) in the document and a frequency with which each unique word (and/or phrase) appears in the document. The bags of words may be used as input features to a machine learning model that may generate a topic model. The topic model may be used to predict one or more topics for input text.

Text-based topic models are language specific. Accordingly, such topic models are only useful for documents in the specific language for which the model has been generated. Described herein are topic modeling techniques that may be used to determine and predict topics for items based only on user interaction data (e.g., past user interactions with items). In other words, the various topic modeling approaches described herein are not text based and are thus language agnostic and can be used to determine the implicit item dimensions that users find the most important for selecting and/or differentiating between items.

Collaborative filtering is a recommendation technique that can be used to provide recommendations to a user and which provides better and better recommendations as more information about the user and similar users is collected. For example, collaborative filtering may be used to recommend similar content to users on the basis of what similar users have liked or disliked. Similar users may be determined based on similarities in user behavior.

For a given item in a catalogue and/or database, a list of similar items may be determined using collaborative filtering. A number of different collaborative filtering approaches are known and may be used in accordance with various embodiments of the present disclosure. In various examples, collaborative filtering may generate a ranked list of items for a given input item. The ranked list may be ranked in terms of a strength of association (or similarity) with the input item. The ranked list may comprise a subset of all the items for which topics are to be generated. For example, the item that is most strongly associated (and/or that is most similar to) the input item may be ranked first, followed by the item that is the next most strongly associated/similar to the input item, and so on. In various examples, item-to-item collaborative filtering may determine strength of association and/or similarity to a given input item based on user behavior. For example, users that viewed a given item (e.g., movie A) may have been more likely to view a second item (e.g., movie B). Collaborative filtering may determine items that are likely to be viewed together by similar users (e.g., users that have been determined to be similar to one another). Other types of user behavior may be used such as, for example, user purchases, user clicks, user downloads, following hyperlinks, etc.

In the examples described herein, the output of such collaborative filtering may be used to generate "documents" that may then be used as inputs to a topic modeling algorithm that may automatically determine a set of overlapping topics for the input items. Topic modeling can be applied to physical items (e.g., items for sale via an online retailer and/or marketplace) as well as to user watching and/or listening behavior. The generated topics implicitly identify the dimensions of items/content that are important to users when selecting between the items, as evidenced by the past user behavior. Additionally, since the topic modeling techniques described herein generate topic models without using any text input, the topic models are language agnostic and may be used across any domains, in spite of potential differences in spoken languages of those domains. As used herein, an item or items may refer to any content (e.g., physical goods for sale via an online marketplace, a product catalog (e.g., an online product catalog of an e-commerce service), digital goods/services for download/streaming, etc.).

FIG. 1 is a block diagram illustrating a topic modeling system 102, according to various embodiments of the present disclosure. Topic modeling system 102 may be implemented using one or more computing devices 110 with each of the one or more computing devices 110 including one or more processors. In addition, in various examples, instructions that may be used to program the one or more processors to perform the various techniques described herein may be stored in non-transitory computer-readable memory 103 ("memory 103"). In various examples, memory 103 may be part of the same physical machine as the computing devices implementing topic modeling system 102. In various other examples, the processors of topic modeling system 102 may communicate with memory 103 over a network 104. In various examples, network 104 may be a wide area network, such as the Internet, while in other embodiments, the network 104 is a local area network (LAN) over which topic modeling system 102 may communicate with memory 103 and/or other devices. In some further embodiments, network 104 is a combination of the Internet and a LAN.

Topic modeling system 102 may receive an input set of items 120. Items 120 may be, for example, any set of items for which topics are to be determined. The topics described herein may be overlapping, such that any given item may belong to more than one topic (although some items may belong to only a single topic). Additionally, there may be examples where a source item is not assigned to any topic and some predicted topics may be empty. In one embodiment, the items 120 may comprise online listings for all items available for purchase via an online marketplace.

Collaborative filtering 122 may be performed for each of the items 120. In various examples, the collaborative filtering 122 finds a set of similar items for each input item of items 120. In the example embodiment, the similarity is based on user behavior. For example, collaborative filtering 122 can be used to determine that, for a given item, users that selected the item were also likely to select 5 other items among items 120. The user behavior may be purchase behavior, click behavior (e.g., clicking on an item to view additional detail about the item), and/or any other user behavior used to determine item-to-item similarity between two items with collaborative filtering 122.

Collaborative filtering 122 generates collaborative filtering output 142 comprising a number of documents 150a, 150b, . . . , 150N. Each document comprises a source item (e.g., source items 124a, 124b, . . . , 124n) and a set of items determined to be similar to the respective source item based on the collaborative filtering. In the example depicted in FIG. 1, items 126a, 126b, . . . , 126N have been determined to be similar to source item 124a using past user behavior. Similarly, items 128a, 128b, . . . , 128N have been determined to be similar to source item 124b and items 130a, 130b, . . . , 130N have been determined to be similar to source item 124n using past user behavior. Although N documents (e.g., documents 150a, 150b, . . . , 150N) and N items (e.g., items 128a, 128b, . . . , 128N) are depicted in various figures, this is not intended to imply that there are the same number (N) of items in each document (e.g., that all documents include the same number N of items) and/or that there are the same number of documents as there are items in each document. In general, there may be any number of items within a document irrespective of the number of items in a different document. Additionally, there may be any number of documents. The number of items in a particular document and the number of documents may depend on the particular collaborative filtering output.

Significantly, collaborative filtering is not performed using textual input and the documents 150a, 150b, . . . , 150N may simply associate items with one another based on item identification numbers.

The set of similar items determined for a given source item in each of documents 150a, 150b, . . . , 150N may be a ranked list of items. Collaborative filtering 122 may generate similarity scores representing a similarity between each item and the source item for a given document. For example, for source item 124a, item 126a may have the highest similarity score among items in document 150a. Item 126b may have the second highest similarity score among the items in document 150a and item 126N may have the lowest similarity score among the items in document 150a. Accordingly, the list of items 126a, 126b, . . . , 126N may be a ranked list ranked in descending order of similarity with respect to source item 124a For example, source item 124a may be a stuffed animal resembling a frog. Item 126a may be an item that is most similar to the stuffed frog as determined using collaborative filtering, while item 126N (depicted as a stuffed mouse in FIG. 1) may be the least similar item among items of document 150a. Further aspects of topic modeling system 102 and/or techniques used by topic modeling system 102 are described below in reference to various other figures.

Figure 2:
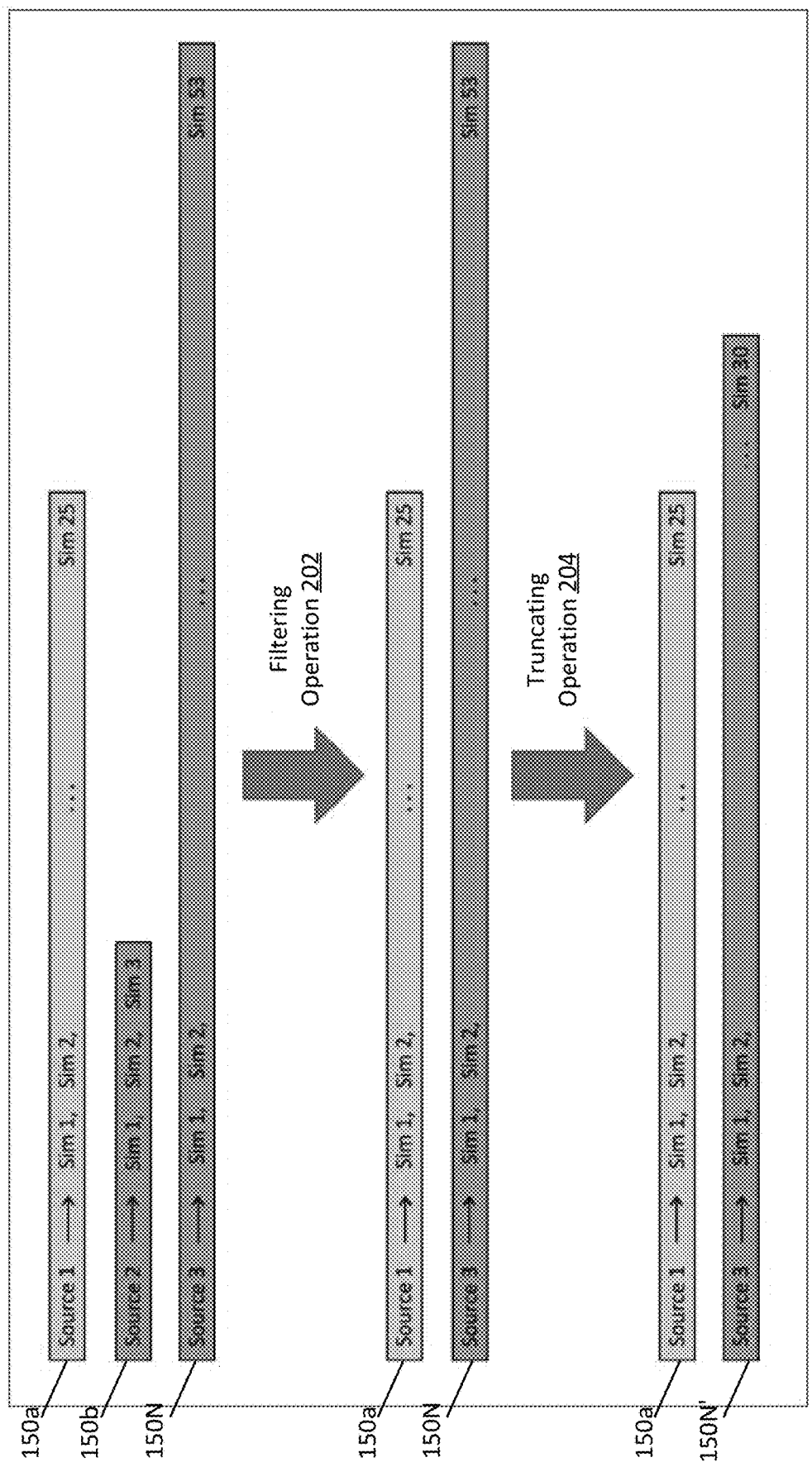
FIG. 2 depicts filtering and truncating operations that may be used in accordance with various embodiments of the present disclosure.

FIG. 2 depicts optional filtering and truncating operations that may be used in accordance with various embodiments of the present disclosure.

As previously described, the collaborative filtering output 142 of FIG. 1. is a dataset of documents 150a, 150b, . . . , 150N. As previously described, each of documents 150a, 150b, . . . , 150N may include any number of items (depicted in FIG. 2 as "sims," such as "Sim 1," "Sim 2," etc.). In various examples, the collaborative filtering output 142 may be stored in a data structure (e.g., an array), with each row being associated with a respective source item, where each row is populated with the ranked list of similar items associated with the relevant source item. For example, each row can include the source item itself (e.g., source item 124b), followed by a ranked list of the similar items (e.g., items 128a, 128b, . . . , 128N).

In various examples, some items may not be included in the dataset because the items do not have sufficient user behavior data to find correlations using collaborative filtering 122 (e.g., new or unpopular items). In various examples, some items that are associated with limited behavior data are present but have only a few similar items. In various examples, such source items may be filtered out to improve the quality of the topic model generated.

For example, a minimum threshold for the number of similar items may be set, source items/documents having a number of similar items that falls below this threshold may be filtered out using filtering operation 202. In the example depicted in FIG. 2, a minimum threshold of 5 has been selected. Accordingly, after performing filtering operation 202, document 150b has been filtered out (e.g., excluded from further processing).

The list of similar items is ranked by collaborative filtering 122 based on correlation to the source item. That is to say, the first few items in a ranked list are the most strongly correlated to the source item, while items appearing farther down the ranked list of items are less strongly correlated to the source item. As previously described, items are correlated with the source item using past user behavior. For example, in collaborative filtering, if users that have viewed the source item have also commonly viewed an item, that item may be strongly correlated with the source item and may have a high similarity score with respect to the source item. In various examples, to improve the topic model quality and to reduce computation time/complexity, a truncating operation 204 may be used to limit the list of similar items for a given source item document to a threshold value. In the example depicted in FIG. 2, truncating operation 204 limits the number of source items to 30. Document 150N is associated with a ranked list of 53 items (e.g., sim 1, sim 2, ..., sim 53). Truncating operation 204 is used to limit the number of items for all documents to 30. In an example, truncating operation 204 may remove the lowest ranked item in the ranked list until the number of items in the ranked list is less than or equal to the threshold value. Accordingly, truncating operation 204 has transformed document 150N into document 150N' that includes a ranked list of 30 similar items (by limiting the document to only the top-30 most strongly correlated items).

Figure 3:
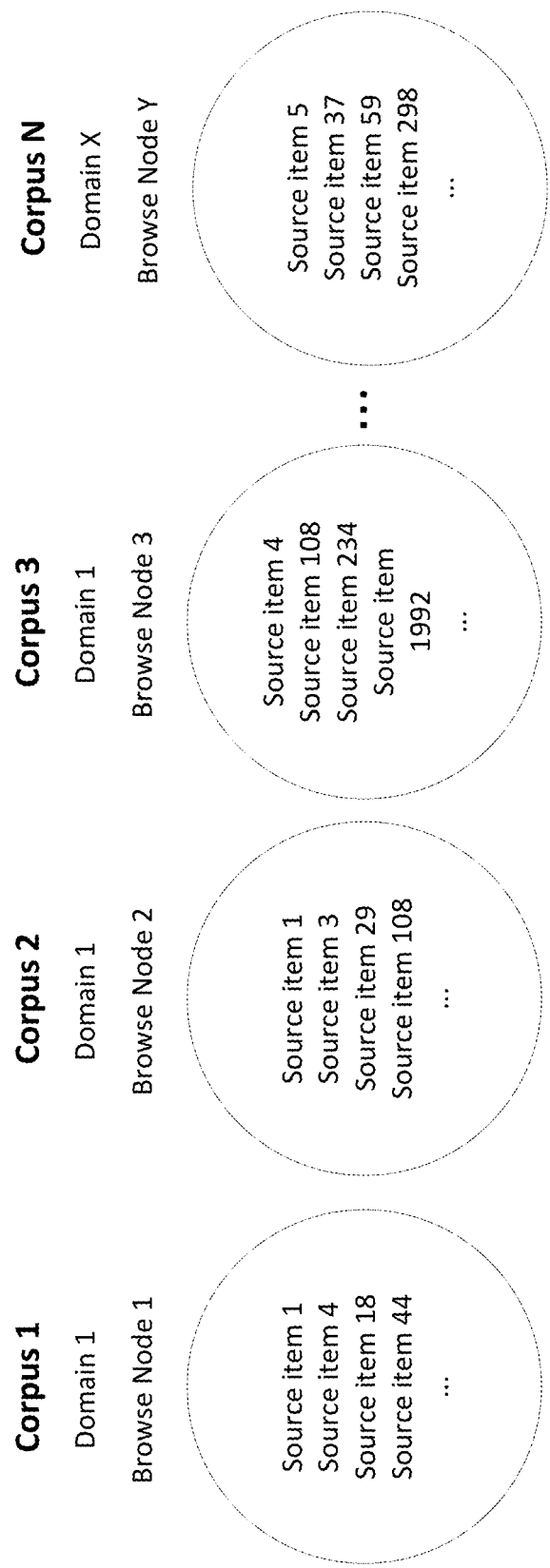
FIG. 3 depicts a block diagram illustrating the grouping of source items, in accordance with various embodiments of the present disclosure.

FIG. 3 depicts a block diagram illustrating the grouping of source items, in accordance with various embodiments of the present disclosure.

After collaborative filtering 122, filtering operation 202, and/or truncating operation 204 there may be a large number (e.g., millions, hundreds of millions) of documents/source items in the dataset. Additionally, the source items may span different types of diverse items (e.g., clothing, furniture, books, tools, groceries, and more). Accordingly, in some examples, prior to performing topic modeling to group items into topics based on their most important implicit attributes, it is typically useful to first segregate source items into broader item categories/groups.

This may be done by separating documents (e.g., documents 150a, 150b, ... 150N) according to a domain (e.g., .com domains versus .uk and .jp domains). Additionally, in some examples, documents may be assigned to one or more categories corresponding to the leaf "browse nodes" of a document's source item. Browse nodes are website navigational elements that reflect product taxonomies. "Leaf" browse nodes are the browse nodes to which items are assigned.

For example, a children's encyclopedia of animals may be assigned to the leaf browse nodes: "us-books/Subjects/Reference/Encyclopedias & Subject Guides/Children's", "us-books/Subjects/Children's Books/Education & Reference/Reference/Encyclopedias", and "us-books/Subjects/Children's Books/Animals/Nonfiction". In this example, the document with the children's encyclopedia as the source item may be assigned to the three categories corresponding to the three aforementioned browse nodes.

The groupings of source items (e.g., according to domains, browse nodes, and/or other characteristics) are referred to herein as "corpora." Accordingly, in FIG. 3, source items 1, 4, 18, and 44 have been grouped into Corpus 1, as these items are classified into browse node 1 and domain 1. Similarly, source items 1, 3, 29, and 108 have been grouped into Corpus 2, as these items are classified into browse node 2 and domain 1. Note that, in the example, source item 1 is classified into both browse node 1 and browse node 2. As described in further detail below, a topic model may be generated for each corpus.

In various examples, the corpora may be filtered based on size (e.g., based on the number of documents/source items included in the corpora). For example, corpora including fewer than 250 documents/source items and/or corpora including more than a million documents/source items may be excluded from the topic modeling algorithm.

Figure 4A:
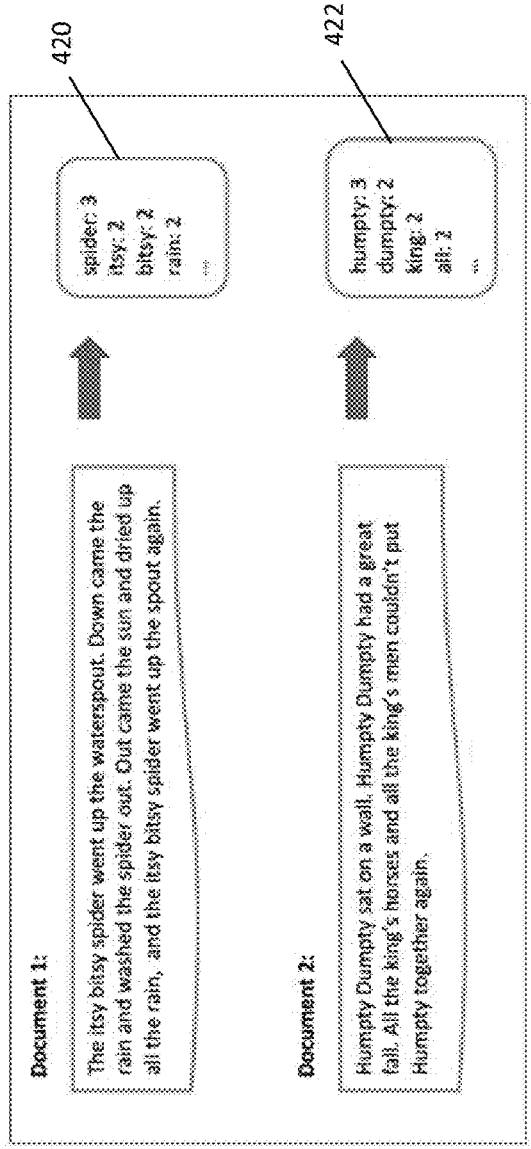
FIG. 4A depicts a conventional conversion of text documents into topic modeling inputs.
Figure 4B:
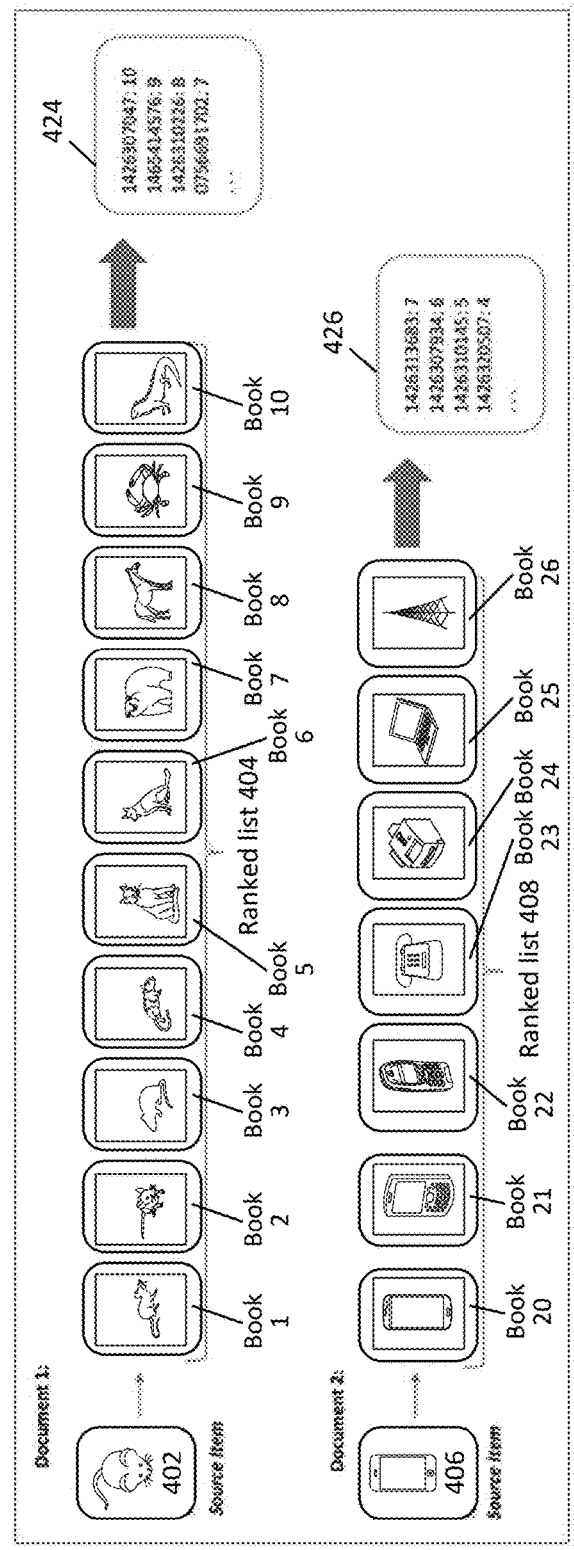
FIG. 4B depicts conversion of non-text documents into topic modeling inputs, in accordance with various aspects of the present disclosure.

FIG. 4A depicts a conventional conversion of text documents into topic modeling inputs. FIG. 4B depicts conversion of non-text documents into topic modeling inputs, in accordance with various aspects of the present disclosure.

Topic modeling algorithms are typically applied to a corpus of text documents. Each text document is transformed into a "bag of words" (e.g., a set of words and their frequencies). The frequency of each word is its weight, which represents the word's prominence within the document. For example, in FIG. 4A document 1 is transformed into bag of words 420 and document 2 is transformed into bag of words 422. Bags of words 420, 422 represent each word in the respective document along with the number of times each word appears in that document.

However, in the various topic modeling techniques described herein, the input documents are not text documents, but rather identifications of source items and ranked lists of similar items. In the example depicted in FIG. 4B, document 1 includes source item 402 and a ranked list 404 of items similar to source item 402 (determined using collaborative filtering 122). For example, source item 402 may be a children's animal encyclopedia and ranked list 404 may comprise a ranked list of similar books (and/or other items). Similarly, document 2 includes source item 406 and a ranked list 408 of items similar to source item 406. Note that unlike with textual topic modeling, item frequencies cannot be used as weights, because each item appears exactly once within a document. Instead, an item's inverse rank may be used as a measure of its prominence since the items are ranked in descending order of similarity with respect to the source item. For example, if a document includes a ranked list of 15 items, the first-ranked item is assigned a weight of 15, the second-ranked item is assigned a weight of 14, etc.

Accordingly, bag of items 424 and 426 assign a weight to each item number among the items in the ranked lists 404, 408. As a specific example, document 1 may include a source item 402 (a children's book with a mouse on the cover) and a ranked list of 10 items (various children's books, animal books, etc.) determined by collaborative filtering 122 to be similar to source item 402 based on user behavior (e.g., clicks, purchases, etc.). Bag of items 424 may associate the inverse rank of each item in ranked list 404 with an identification number identifying that item.

Similarly, document 2 may include a source item 406 (e.g., a book with a mobile phone on the cover) and a ranked list of books 20-26 determined by collaborative filtering 122 to be similar to source item 406 based on user behavior. Bag of items 426 may associate the inverse rank of each item in ranked list 408 with an identification number identifying that item.

The source item is unassociated with a rank, and so the weight for the source item is undefined. As such, the source item is excluded from the bags of items 424, 426.

Figure 5:
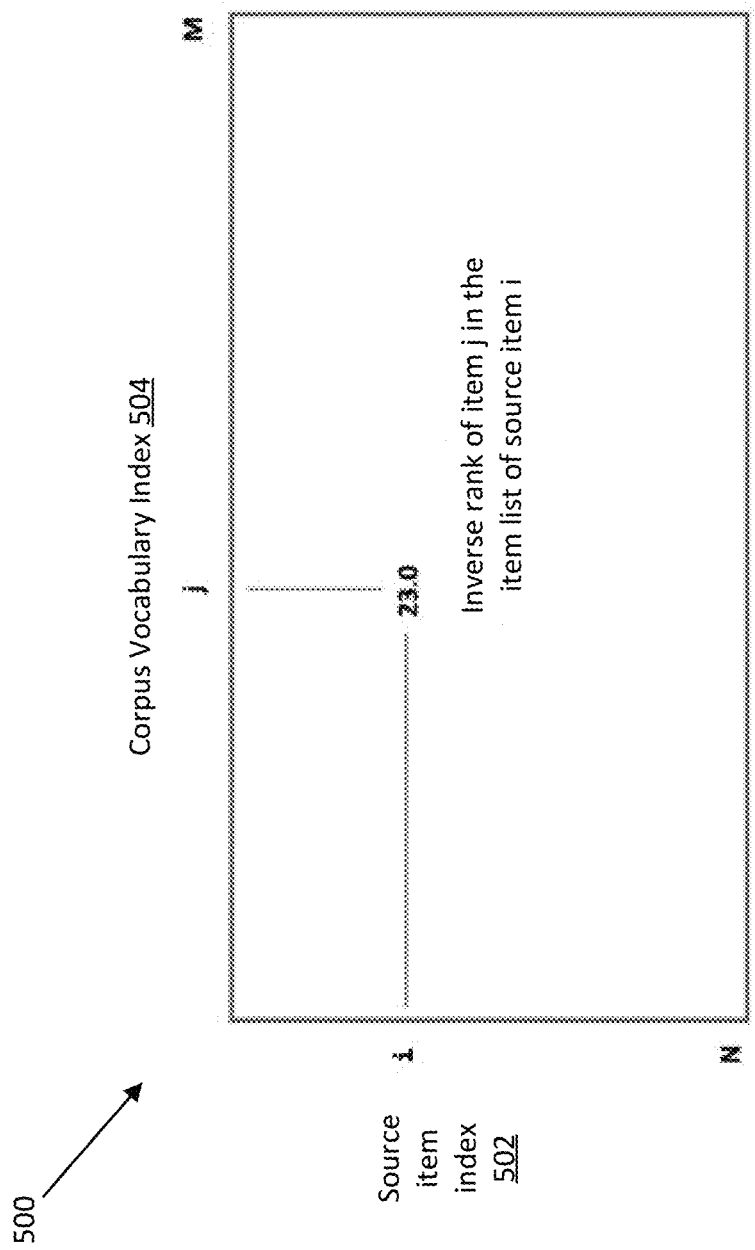
FIG. 5 depicts a two-dimensional input matrix for each corpus that may be used to perform topic modeling, in accordance with the various techniques described herein.

FIG. 5 depicts a two-dimensional input matrix 500 for each corpus that may be used to perform topic modeling, in accordance with the various techniques described herein. The two-dimensional input matrix 500 may be topic modeling input data that may be input into a topic modeling algorithm to generate a topic model for the plurality of items to be categorized (e.g., for a particular corpus of input data).

For each corpus, after transforming the documents into bags of items (e.g., bags of items 424, 426), the bags of items are encoded into a two-dimensional input matrix 500 of data (e.g., floats). The matrix is of size (N, M), where N is the number of source items, and M is the number of unique items among the ranked lists for each document in the corpus. In some examples, the set of unique items among the ranked lists of a corpus may be referred to as the corpus vocabulary. Accordingly, two-dimensional input matrix 500 may include a source item index 502 and a corpus vocabulary index 504. Each row of the two-dimensional input matrix 500 may encode the bag of items derived from one document (e.g., associated with the row's source item). Each matrix element (i,j) stores the weight value (inverse rank) of unique corpus item j for source item i. Accordingly, for each corpus generated, a two-dimensional input matrix 500 may be generated.

As a given source item is only associated with a set number of items (e.g., a truncated number of items limited using truncating operation 204, the two-dimensional input matrix 500 may be sparse. The sparsity of the two-dimensional input matrix 500 may reduce computational complexity and/or increase speed and/or performance of the topic modeling.

For each corpus, mapping data may be generated that maps each row index of the two-dimensional input matrix 500 to the corresponding source item identifier (e.g., data identifying the source item). Additionally, the mapping data may map each column index of the two-dimensional input matrix 500 to the identifier for the corresponding item (e.g., the particular unique item among the ranked lists for each document in the corpus). This mapping data may be used to transform the numeric outputs of the topic model back into the relevant items from the plurality of items 120.

Various topic modeling training options and/or algorithms exist and may be used in accordance with the various techniques described herein. In general, it is a goal of the topic modeling training to generate a topic model that is both highly relevant (e.g., the topic model can generate highly relevant topic predictions for each source item) and highly cohesive (e.g., each topic includes a cohesive collection of items).

In various examples, prior to processing the two-dimensional input matrix for each corpus (e.g., two-dimensional input matrix 500), the two-dimensional input matrix may be pre-processed using a term frequency-inverse document frequency (TF-IDF) transformation. Pre-processing the two-dimensional input matrices using TF-IDF may improve relevancy of the resulting source-item-to-topic predictions.

Figure 6:
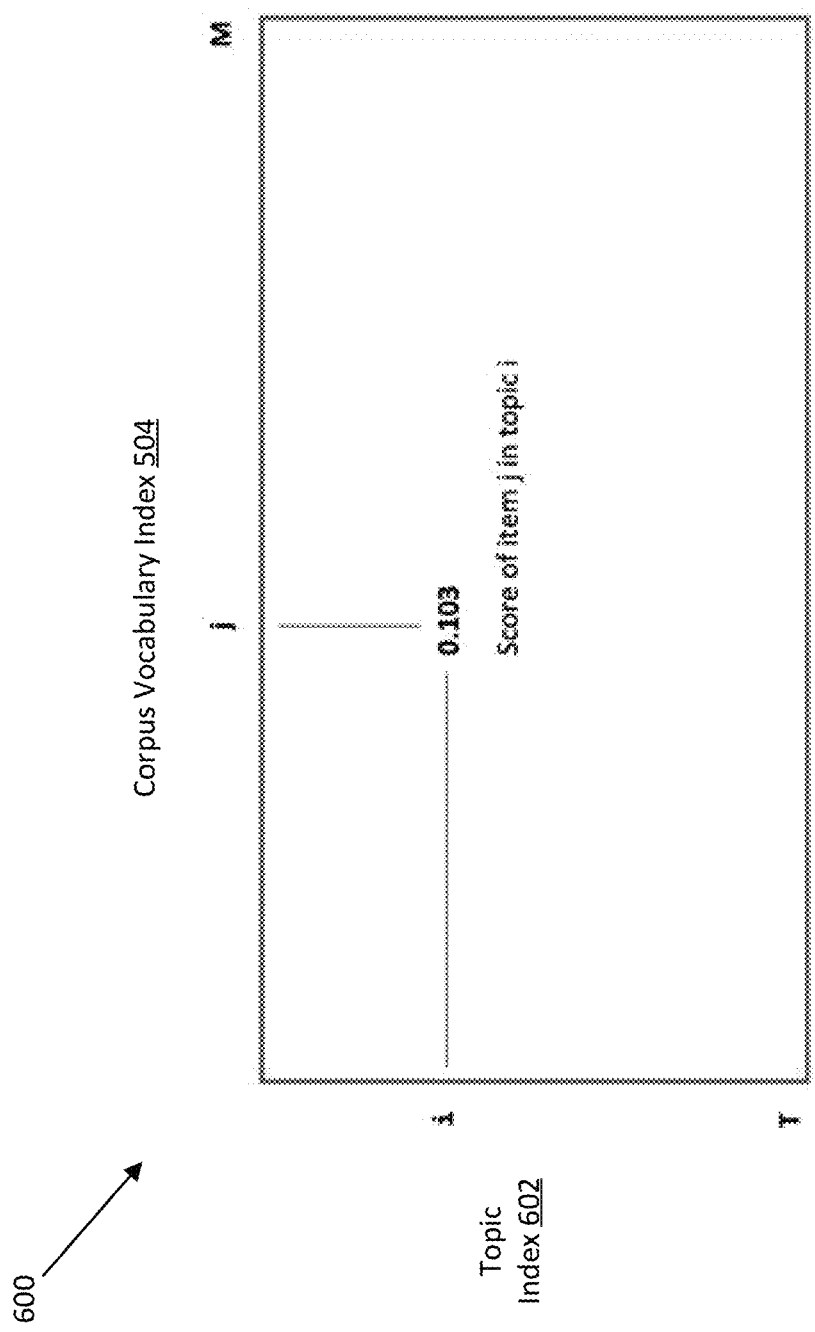
FIG. 6 depicts an example topic model that may be generated in accordance to various aspects of the present disclosure.

In various examples, a non-negative matrix factorization (NMF) algorithm may be used to generate a topic model (as shown in FIG. 6). NMF may be used to generate highly-cohesive topics and (provided that the two-dimensional input matrix is pre-processed using TF-IDF) may generate highly-relevant source-item-to-topic predictions. In at least some examples, other topic modeling algorithms may be used instead of or in addition to NMF. For example, one or more Latent Direchlet Allocation algorithms and/or Neural Topic Modeling algorithms may be used in place of or in addition to NMF. However, the particular results may be highly dependent upon the particular combination of pre-processing steps, the NMF algorithm, and the hyperparameters selected.

Prior to using NMF to generate a topic model, a number of topics is selected for topic modeling for the corpus. In various examples, a heuristic may be used to determine an appropriate number of topics for a given corpus. For example, the following heuristic may be used:

$$n\_components = size\_of\_vocabulary/100$$

where the size_of_vocabulary represents the set of unique items among the ranked lists for each document of the corpus (and also corresponding to the columns of the two-dimensional input matrix). n_components represents the number of topics for the corpus.

An example set of hyperparameters for using NMF for topic modeling in accordance with the various techniques described herein is provided below. However, it should be appreciated that other hyperparameter values may be selected in accordance with the desired implementation and that the hyperparameters specifically mentioned below are for example purposes only.

Example NMF Hyperparameters
alpha=0.1
l1_ratio=0.5
init='nndsvd'
solver='cd'
beta_loss='frobenius'
tol=0.0001
max_iter=200
random_state=None
verbose=0
shuffle=False In some examples, the regularization may drive all weights within a topic to zero, effectively filtering out some of the less-cohesive topics. Note that the l1_ratio hyperparameter is set to 0.5, which means that a blend of L1 and L2 regularization is applied. Including an L1 penalty may drive some weights to zero, which may help remove less cohesive topics.

After constructing an instance of NMF with the above-described hyperparameters, the NMF model may be fit to the two-dimensional input numeric array (e.g., two-dimensional input matrix 500). The resulting topic model is a two-dimensional numeric array of size (T, M), where T is the number of requested topics (e.g., the value of the selected number of topics n_components) and M is the vocabulary size (e.g., the number of columns in the two-dimensional input matrix). FIG. 6 depicts an example topic model 600. Each element (i,j) of the topic model 600 matrix/array is the prediction score of item j (indexed by corpus vocabulary index 504) in topic i (indexed by topic index 602). Higher prediction scores indicate stronger associations with the topic. Due to regularization, some topics may be empty (e.g., all of the scores in that row of topic model 600 may be empty).

Figure 7:
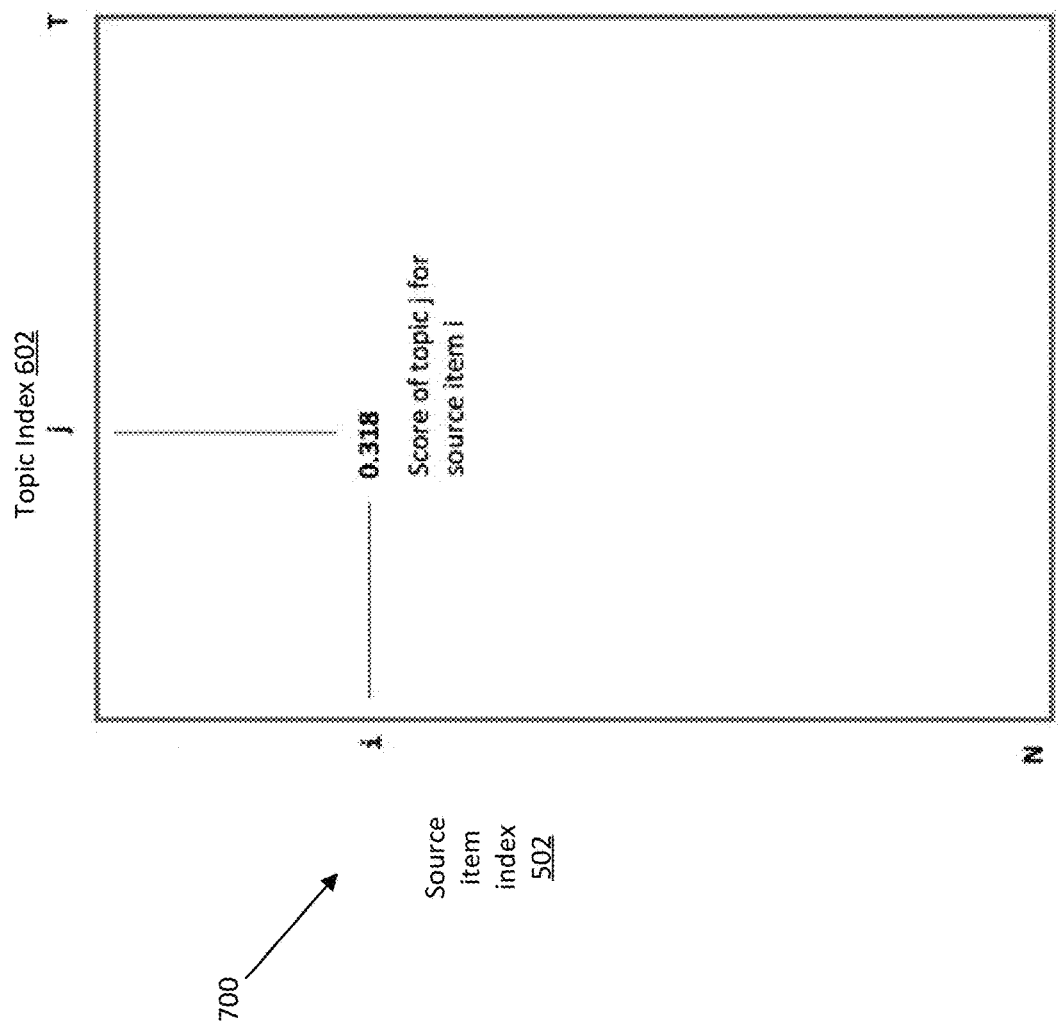
FIG. 7 is an example predictions matrix that predicts topics for each source item in a corpus, in accordance with various aspects of the present disclosure.

FIG. 7 is an example predictions matrix 700 that predicts topics for each source item in a corpus, in accordance with various aspects of the present disclosure. After training the model as described above, the transform( ) method may be applied (e.g., using scikit learn's NMF algorithm) to generate source-item-to-topic predictions. The predictions are in the form of a two-dimensional predictions matrix 700 of size (N, T), where N is the number of source items (e.g., the number of rows in two-dimensional input matrix 500) and T is the number of selected topics (e.g., the requested number of topics according to the n_components hyperparameter and the number of rows in topic model 600). Each element (i,j) is the score of topic j for source item i, and higher scores may indicate stronger associations of the topic with the source item (e.g., relative to topics with lower scores for the same source item).

Figure 8:
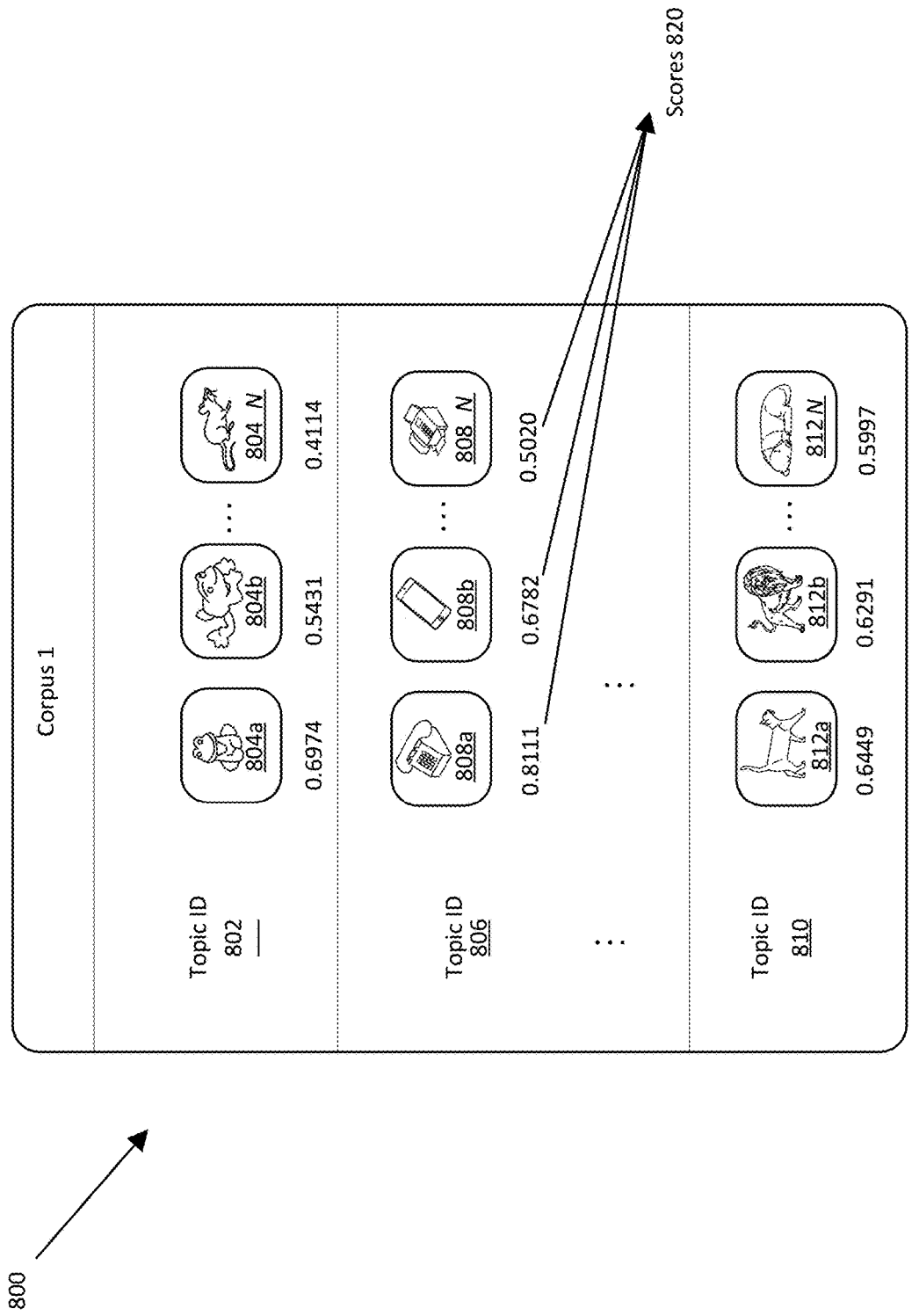
FIG. 8 is an example of a mapping from a predicted topic to a ranked list of items for the predicted topic, in accordance with various embodiments of the present disclosure.

FIG. 8 is an example of a mapping 800 from a predicted topic to a ranked list of items for the predicted topic, in accordance with various embodiments of the present disclosure. As previously described, any number of items may be associated with each of the topics (e.g., topic IDs 802, 806, . . . , 810). In addition there may be different numbers of items associated with each topic. Accordingly, the fact that each list of items depicted in FIG. 8 ends with an item with the index "N," is not intended to indicate that each topic ID is associated with the same number N of items.

The mapping from column index to the identifier of the corresponding item may be used to transform the topic model 600 (FIG. 6) to a mapping 800 from a topic identifier (e.g., topic ID 802, 806, 810, etc.) to a ranked list of items for each topic ID. In FIG. 8, the mapping 800 may be generated for a browse node of figurines and/or plush toys, for example. For example, in FIG. 8, topic ID 802 (e.g., a topic representing stuffed animals and/or stuffed frogs) is associated with items 804a, 804b, . . . , 804N, topic ID 806 (e.g., a topic representing telephones) is associated with items 808a, 808b, . . . , 808N, and topic ID 810 (e.g., a topic representing cat figurines) is associated with items 812a, 812b, . . . , 812N. The list of items may be ranked in descending order of relevance scores, where the relevance scores represent a strength of association between a given item and the topic ID. For example, scores 820 represent respective associations between items 808a, 808b, . . . , 808N and the topic represented by topic ID 806. Conceptually, the mapping 800 associates topic IDs with a list of the items most strongly associated with those topics, ranked by strength of association.

Figure 9A:
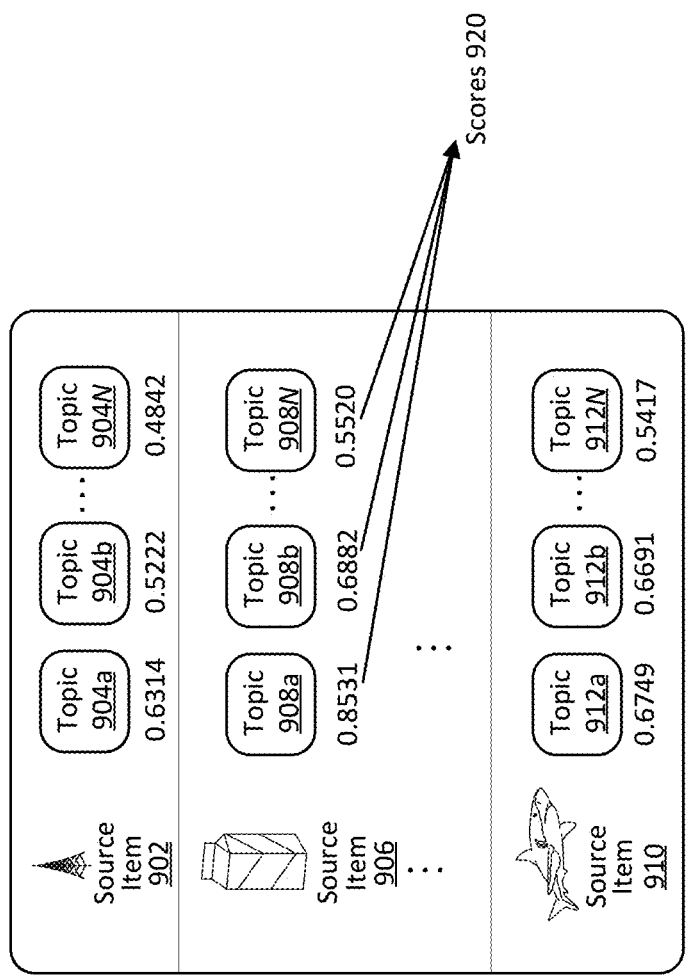
FIG. 9A is an example of a mapping from a source item to a ranked list of associated topics, in accordance with various aspects of the present disclosure.

FIG. 9A is an example of a mapping from a source item to a ranked list of associated topics, in accordance with various aspects of the present disclosure.

In various examples, the mapping from row index to source item (described above) may be used to transform the predictions matrix 700 (described above in reference to FIG. 7) to a mapping from source item to a ranked list of associated topics (e.g., sorted in descending order by value). Exclude source items that have no predicted topics.

In the example depicted in FIG. 9A, source items 902, 906, . . . , 910, etc., may each be associated with a list of topics. For example, topics 904a, 904b, . . . , 904N may be associated with source item 902. Topics 904a, 904b, . . . , 904N may be associated with respective scores representing the strength of association between the topics 904a, 904b, . . . , 904N and the source item 902. Similarly, topics 908a, 908b, . . . , 908N may be displayed in association with source item 906. Scores 920 represent respective strengths of association of source item 906 with each of topics 908a, 908b, . . . , 908N. Similarly, topics 912a, 912b, . . . , 912N may be displayed in association with source item 910. Scores 920 may be displayed for each topic representing a strength of association between the topic and the relevant source item.

Figure 9B:
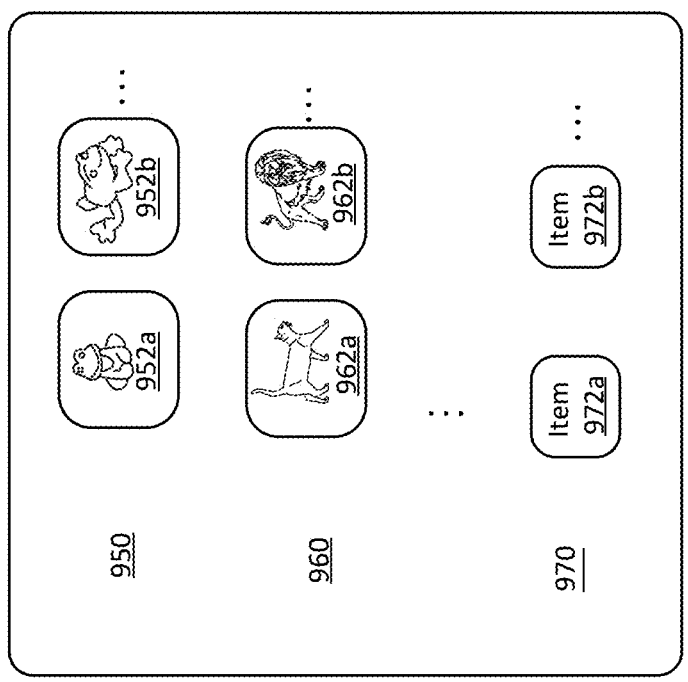
FIG. 9B is an example of a mapping from a corpus to a list of associated topics that are subcategories of the corpus, in accordance with various aspects of the present disclosure.

FIG. 9B is an example of a mapping from a corpus to a list of associated topics that are subcategories of the corpus (e.g., a particular browse node), in accordance with various aspects of the present disclosure.

In FIG. 9B topics 950, 960, and 970 may each be a subcategory of a particular corpus. For example, if the corpus (e.g., a browse node) is stuffed animals, topic 950 may be a topic including items 952a, 952b, etc., that are all stuffed frogs. Similarly, topic 960 may be a topic including items 962a, 962b, that are all stuffed cats. Topic 970 may be a topic that includes items 972a, 972b, etc. In the example of topic 970, topic 970 may represent a particular brand of stuffed animals where each item may be a stuffed animal of a different type (e.g., item 972a may be a monkey and item 972b may be a giraffe, etc.) but all the items of topic 970 may be of the same brand. Accordingly, the various techniques described herein may be used to determine subcategories for a broader categories of items determined as being similar via collaborative filtering.

Since the topics are generated based on past user behavior, the topics may represent product attributes that are important to users (as evidenced by past user behavior). For example, in the topics depicted in FIG. 9B, sometimes the items are grouped by brand and sometimes by stuffed animal type. Additionally, using the various techniques described herein the topics may be overlapping. Accordingly, a particular item may appear in multiple topics. For example, a stuffed frog by brand Y may appear in both a first topic that encompasses stuffed frogs and a second topic that is for stuffed animals by brand Y.

In various examples described herein, a single topic model is generated for each corpus. However, working with a large number of individual topic models (in the case where there are a large number of corpora) can be unwieldy. Accordingly, optionally all the various outputs may be combined into one or more databases. The one or more databases may include a mapping from each source item to a list of the corpora to which the source item belongs. The one or more databases may further include a mapping from each source item (in each corpus) to the topics associated with that source item. The one or more databases may further include a mapping from each corpus to a list of topics (e.g., non-empty topics). The one or more databases may further include a mapping from each topic ID (in each corpus) to its associated items. The one or more databases may further include a mapping from each browse node to a list of the browse node's corpora.

Automatically categorizing items into topics may provide improved ingress points into marketplaces and/or other browsing systems for users. For example, a banner may be displayed that states "See what other users have enjoyed for <browse node>." Clicking on the banner may take the user to a page that displays all of the topics for the selected browse node. Users may then scroll through the topics. Additionally, popular topics within a particular category may be displayed for a user. For example, a popular topic within a specific genre of books, movies, music, clothing category, etc., may be displayed for browsing by a user. Additionally, selected items may be used to infer one or more topics of interest in order to provide a selection of items that include at least one trait or combination of traits for which the user has demonstrated interest (based on their previously selected item). Additionally, if browse nodes of interest to a user are known, the first few items for topics associated with that browse node may be displayed to the user.

In some examples, topics may be used to identify misclassified items. For example, human observers are often able to notice that items are sometimes assigned to incorrect item groups and/or incorrect browse nodes. Topic modeling, as described herein, provides a way to automatically discover such incorrectly assigned item attributes.

Because the items within each topic tend to be very uniform, the distributions of item groups and browse nodes may be computed within each topic. Outliers may be flagged for human review. In another example, topic modeling may be used to identify products marked as "adult products" in an online marketplace. Products classified as "adult products" may not be suitable for all viewers. For example, an online catalog may include an "IsAdultProduct" attribute, which may not be accurately set for all adult products. Because the items within each topic tend to be very uniform, if any item within a topic is marked as adult, the entire topic may be flagged for human review.

Figure 10:
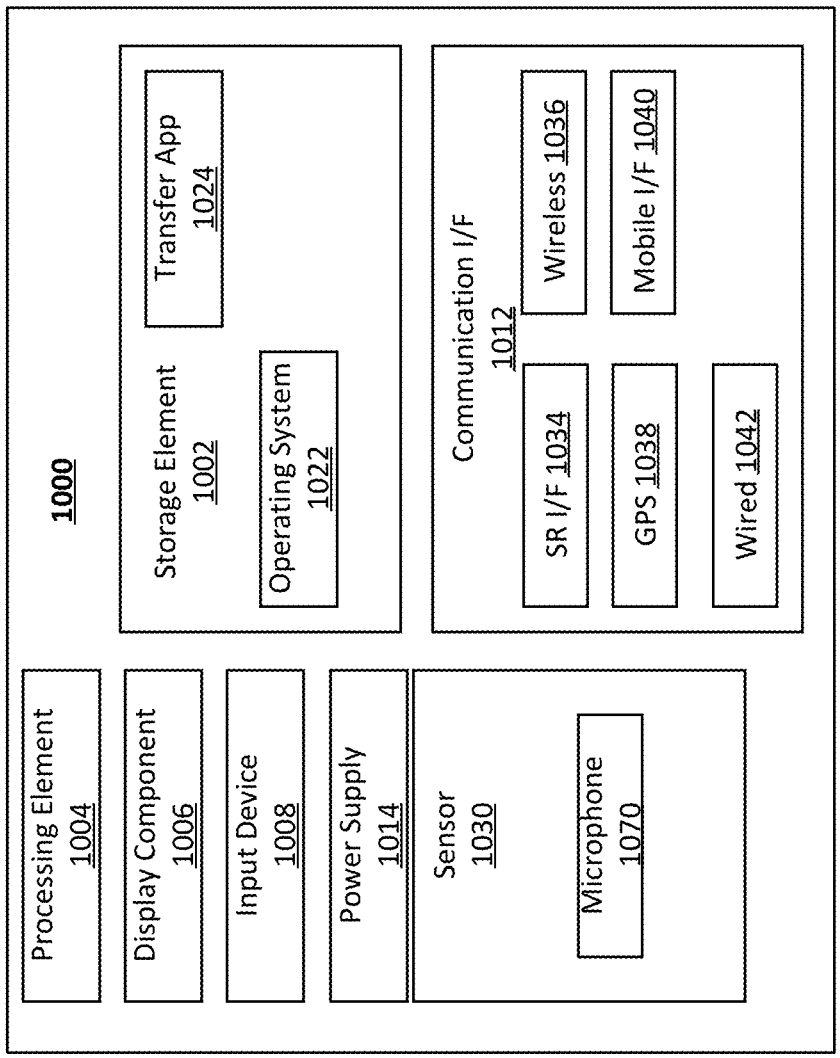
FIG. 10 is a block diagram showing an example architecture of a computing device that may be used in accordance with various embodiments described herein.

FIG. 10 is a block diagram showing an example architecture 1000 of a computing device that may be used in topic modeling, in accordance with various aspects of the present disclosure. It will be appreciated that not all devices will include all of the components of the architecture 1000 and some user devices may include additional components not shown in the architecture 1000. In an example embodiment, the architecture 1000 includes one or more processing elements 1004 for executing instructions and retrieving data stored in a storage element 1002. The processing element 1004 comprises at least one processor. Any suitable processor or processors may be used. For example, the processing element 1004 may comprise one or more digital signal processors (DSPs). The storage element 1002 can include one or more different types of memory, data storage, or computer-readable storage media devoted to different purposes within the architecture 1000. In an example embodiment, the storage element 1002 comprises flash memory, random-access memory, disk-based storage, etc. Different portions of the storage element 1002, for example, are used for program instructions for execution by the processing element 1004, storage of images or other digital works, and/or a removable storage for transferring data to other devices, etc. Additionally, storage element 1002 may store various matrices, data structures, similarity scores and/or other values determined using the above-described techniques.

The storage element 1002 may also store software for execution by the processing element 1004. An operating system 1022 may provide the user with an interface for operating the computing device and may facilitate communications and commands between applications executing on the architecture 1000 and various hardware thereof. In an example embodiment, a transfer application 1024 is configured to receive images, audio, and/or video from another device (e.g., a mobile device, image capture device, and/or display device) and/or from microphone 1070 included in the architecture 1000.

When implemented in some user devices, the architecture 1000 comprises a display component 1006. The display component 1006 can comprise one or more light-emitting diodes (LEDs) or other suitable display lamps. Also, in some examples, the display component 1006 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 1006 may be effective to display input images and/or segmentation masks generated in accordance with the various techniques described herein.

The architecture 1000 may also include one or more input devices 1008 operable to receive inputs from a user. Example input devices 1008 include a push button, touch pad, touch screen, wheel, joystick, keyboard, mouse, trackball, keypad, light gun, game controller, or any other such device or element whereby a user can provide inputs to the architecture 1000. These input devices 1008 may be incorporated into the architecture 1000 or operably coupled to the architecture 1000 via wired or wireless interface. In some examples, architecture 1000 may include a microphone 1070 or an array of microphones for capturing sounds, such as voice requests. In various examples, audio captured by microphone 1070 may be streamed to external computing devices via communication interface 1012.

When the display component 1006 includes a touch-sensitive display, the input devices 1008 can include a touch sensor that operates in conjunction with the display component 1006 to permit users to interact with the image displayed by the display component 1006 using touch inputs (e.g., with a finger or stylus). The architecture 1000 may also include a power supply 1014, such as a wired alternating current (AC) converter, a rechargeable battery operable to be recharged through conventional plug-in approaches, or through other approaches such as capacitive or inductive charging.

In an embodiment, the communication interface 1012 comprises one or more wired or wireless components operable to communicate with one or more other computing devices. For example, the communication interface 1012 may comprise a wireless communication module 1036 configured to communicate on a network, such as the network 104, according to any suitable wireless protocol, such as IEEE 802.11 or another suitable wireless local area network (WLAN) protocol. In an embodiment, a short range interface 1034 is configured to communicate using one or more short range wireless protocols such as, for example, near field communications (NFC), Bluetooth®, Bluetooth LE, etc. In an embodiment, a mobile interface 1040 is configured to communicate utilizing a cellular or other mobile protocol. A Global Positioning System (GPS) interface 1038 may be in communication with one or more earth-orbiting satellites or other suitable position-determining systems to identify a position of the architecture 1000. In an embodiment, a wired communication module 1042 is configured to communicate according to the USB protocol or any other suitable protocol.

The architecture 1000 may also include one or more sensors 1030 such as, for example, one or more position sensors, image sensors, and/or motion sensors. A microphone 1070 is shown in FIG. 10, by way of example.

As noted above, multiple devices may be employed in a single system. In such a multi-device system, each of the devices may include different components for performing different aspects of the system's processing. The multiple devices may include overlapping components. The components of the topic modeling system 102, as described herein, are exemplary, and may be located as a stand-alone device or may be included, in whole or in part, as a component of a larger device or system.

Figure 11:
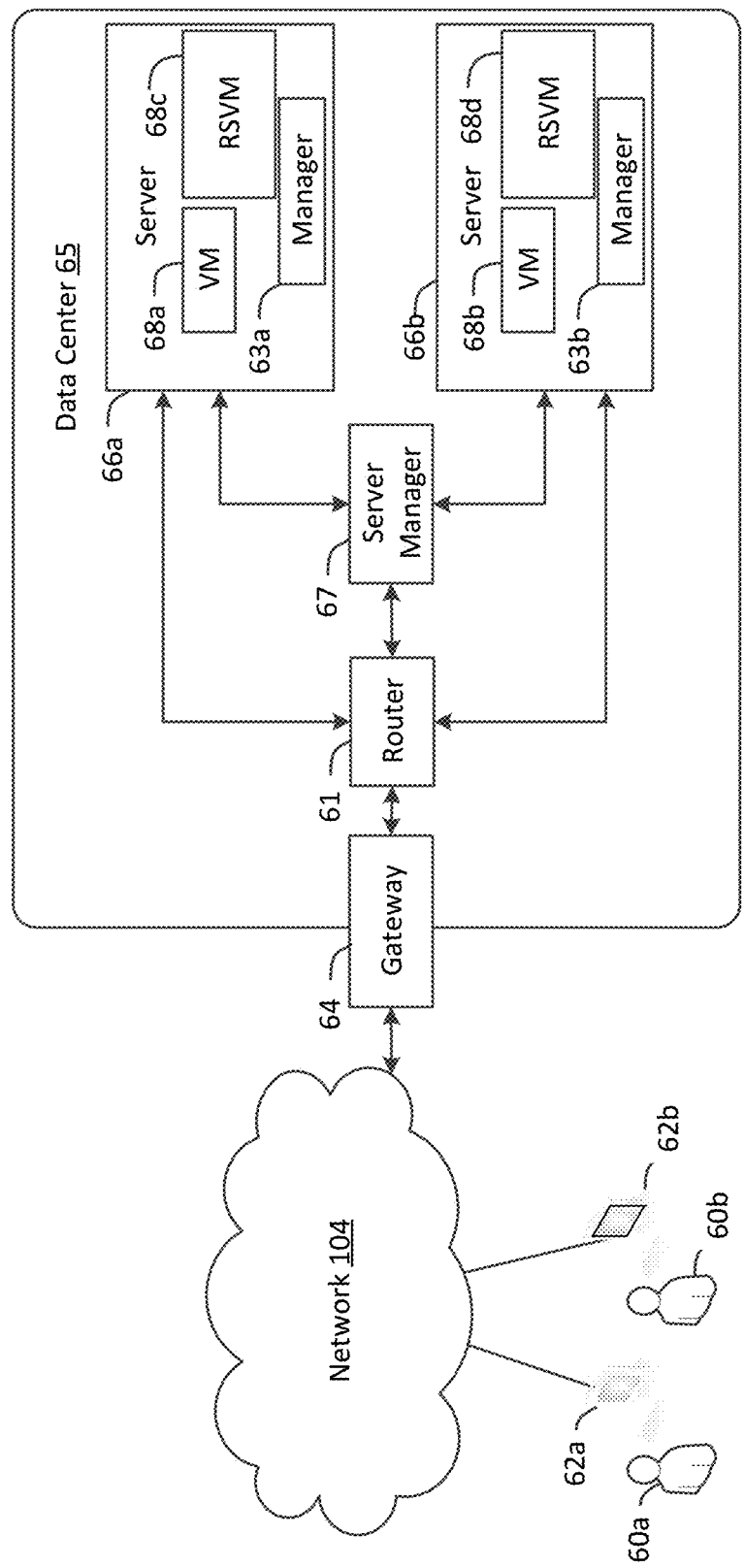
FIG. 11 is a diagram illustrating an example system for sending and providing data that may be used in accordance with the present disclosure.

An example system for sending and providing data and performing various computer processing techniques will now be described in detail. In particular, FIG. 11 illustrates an example computing environment in which the embodiments described herein may be implemented. For example, the computing environment of FIG. 11 may be used to provide ranking of search results as a service over a network wherein one or more of the techniques described herein may be requested by a first computing device and may be performed by a different computing device configured in communication with the first computing device over a network. FIG. 11 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more techniques of the topic modeling system 102, as described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 11 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and enabling computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 11, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 11 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 11, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 11, a data center 65 is also employed to at least in part direct various communications to, from and/or between servers 66a and 66b. While FIG. 11 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 11 has been greatly simplified and that many more networks and networking devices may be utilized to interconnect the various computing systems disclosed herein. These network topologies and devices should be apparent to those skilled in the art.

It should also be appreciated that data center 65 described in FIG. 11 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems, systems that support various interpreted or compiled programming languages such as Ruby, Perl, Python, C, C++ and the like or high-performance computing systems) suitable for the applications, without, for example, requiring the client to access an instance or an execution platform directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware, a virtual machine instance executing on a server or some combination of the two. Various types and configurations of instances may be made available, including different sizes of resources executing different operating systems (OS) and/or hypervisors, and with various installed software applications, run-times and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of topic modeling, the method comprising:
    identifying a plurality of items from a product catalog for topic modeling;
    identifying a first source item;
    determining a first ranked list of a first subset of the plurality of items using collaborative filtering, wherein the first subset of the plurality of items are determined to be related to the first source item based on past user behavior with respect to the first source item and the first subset of the plurality of items, and wherein items of the first ranked list are ranked by strength of association with the first source item;
    generating a plurality of weights comprising a corresponding weight for each item in the first ranked list, wherein the weight of an item is an inverse rank of the item in the first ranked list;
    generating a first matrix comprising a first number of rows and a first number of columns, wherein a first row of the first matrix corresponds to the first source item, and wherein a respective column of the first matrix corresponds to each item in the first ranked list;

populating the first row of the first matrix with the plurality of weights;
selecting a first number of topics for a topic model;
generating the topic model by inputting the first matrix into a non-negative matrix factorization algorithm, wherein the topic model is a second matrix, wherein each row of the second matrix corresponds to a respective topic; and
generating, for the first source item, a prediction score for each of the first number of topics.

2. The computer-implemented method of claim 1, further comprising:
identifying a second source item;
determining a second ranked list of a second subset of the plurality of items using collaborative filtering, wherein the second subset of the plurality of items have been determined to be associated with the second source item;
identifying a third source item;
determining a third ranked list of a third subset of the plurality of items using collaborative filtering, wherein the third subset of the plurality of items have been determined to be associated with the third source item;
determining that a first number of items in the second ranked list is below a first threshold;
discarding the second ranked list prior to generating the topic model;
determining that a first number of items in the third ranked list exceeds a second threshold; and
removing the lowest ranked item in the third ranked list until the number of items in the third ranked list is less than or equal to the second threshold.

3. The computer-implemented method of claim 1, further comprising:
receiving a selection of a second source item;
determining, for the second source item, a plurality of topics using the topic model; and
determining, for each of the plurality of topics, a plurality of items associated with the second source item.

4. A method comprising:
selecting a first item of a plurality of items from a first catalog;
generating, for the first item, a first ranked list of items from the plurality of items using collaborative filtering, wherein each item of the first ranked list of items is ranked based on a respective strength of association with the first item determined using past user behavior associating the first item with the respective item of the first ranked list;
generating topic modeling input data representing associations between the first item and each item in the first ranked list;
determining a first number of topics for a topic modeling algorithm;
generating a first topic model comprising the first number of topics for the first ranked list of items by inputting the topic modeling input data into the topic modeling algorithm, wherein the first topic model comprises a matrix associating respective topics with respective items of the plurality of items; and
determining, for the first item using the first topic model, a prediction score for each of the first number of topics.

5. The method of claim 4, further comprising:
determining that a second item is classified in the same group as the first item;
generating, for the second item, a second ranked list of items from the plurality of items using collaborative filtering; and
generating the topic modeling input data further representing associations between the second item and each item in the second ranked list.

6. The method of claim 4, further comprising receiving a selection of the first number of topics.

7. The method of claim 4, further comprising:
receiving a selection of a second item; and
generating a ranked list of the first number of topics for the second item.

8. The method of claim 4, further comprising generating the first ranked list based on data indicating that a user that viewed the first item also viewed one or more items in the first ranked list of items.

9. The method of claim 4, wherein the topic modeling input data comprises a weight representing an inverse rank of each item in the first ranked list of items, wherein each inverse rank represents a similarity between the first item and a respective item of the first ranked list of items.

10. The method of claim 4, further comprising determining, for each item of the first ranked list of items, a corresponding similarity score output by the collaborative filtering, wherein the topic modeling input data includes the corresponding similarity score for each item of the first ranked list of items.

11. The method of claim 4, wherein:
the topic modeling algorithm is a non-negative matrix factorization algorithm; and
the topic modeling input data comprises a matrix relating the first item to weights for the items of the first ranked list of items, the weights representing an inverse rank of the items of the first ranked list of items.

12. The method of claim 4, further comprising:
generating, for a first topic of the topics, a second ranked list of items pertaining to the first topic, ranked in order of relevance to the first topic; and
generating, for a second topic of the topics, a third ranked list of items pertaining to the second topic, ranked in order of relevance to the second topic.

13. A system comprising:
at least one processor; and
at least one non-transitory computer-readable memory storing instructions that, when executed by the at least one processor, are effective to program the at least one processor to:
identify a first item of a plurality of items from a first catalog;
generate, for the first item, a first ranked list of items from the plurality of items using collaborative filtering, wherein each item of the first ranked list of items is ranked based on a respective strength of association with the first item, the strength of association determined using past user behavior associating the first item with the respective item of the first ranked list;
generate topic modeling input data representing associations between the first item and each item in the first ranked list;
determine a first number of topics for a topic modeling algorithm;
generate a first topic model comprising the first number of topics for the first ranked list of items by inputting the topic modeling input data into the topic modeling algorithm, wherein the first topic model comprises a matrix associating respective topics with respective items of the plurality of items;

determine, for the first item using the first topic model, a respective prediction score for each of the first number of topics; and display a representation of at least one of the first number of topics.

14. The system of claim 13, wherein the at least one non-transitory computer-readable memory stores further instructions that, when executed by the at least one processor, are further effective to program the at least one processor to:

determine that a second item is classified in the same group as the first item;

generate, for the second item, a second ranked list of items from the plurality of items using collaborative filtering; and generate the topic modeling input data further representing associations between the second item and each item in the second ranked list.

15. The system of claim 13, wherein the at least one non-transitory computer-readable memory stores further instructions that, when executed by the at least one processor, are further effective to program the at least one processor to:

receive a selection of the first number of topics.

16. The system of claim 13, wherein the at least one non-transitory computer-readable memory stores further instructions that, when executed by the at least one processor, are further effective to program the at least one processor to:

receive a selection of a second item; and generate a ranked list of the first number of topics for the second item.

17. The system of claim 13, wherein the at least one non-transitory computer-readable memory stores further instructions that, when executed by the at least one processor, are further effective to program the at least one processor to generate the first ranked list based on data indicating that a user that viewed the first item also viewed one or more items in the first ranked list of items.

18. The system of claim 13, wherein the topic modeling input data comprises a weight representing an inverse rank of each item in the first ranked list of items, wherein each inverse rank represents a similarity between the first item and a respective item of the first ranked list of items.

19. The system of claim 13, wherein the at least one non-transitory computer-readable memory stores further instructions that, when executed by the at least one processor, are further effective to program the at least one processor to:

determine, for each item of the first ranked list of items, a corresponding similarity score output by the collaborative filtering, wherein the topic modeling input data includes the corresponding similarity score for each item of the first ranked list of items.

20. The system of claim 13, wherein:

the topic modeling algorithm is a non-negative matrix factorization algorithm; and the topic modeling input data comprises a matrix relating the first item to weight values for the items of the first ranked list of items, the weight values representing an inverse rank of the items of the first ranked list of items.

* * * * *